April 29, 1952         Z. I. KERTESZ         2,595,082
SIMPLE TURBIDITY MEASURING DEVICE
Filed April 25, 1950
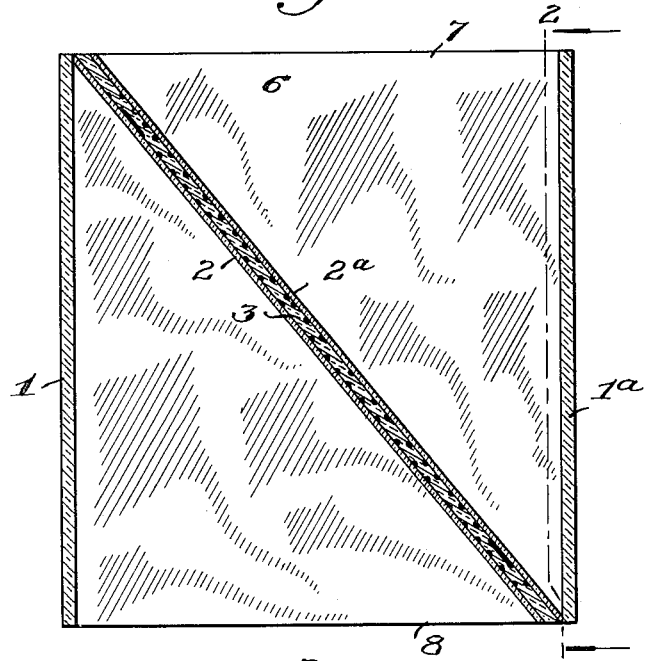
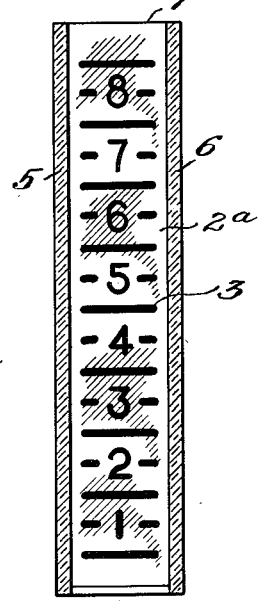
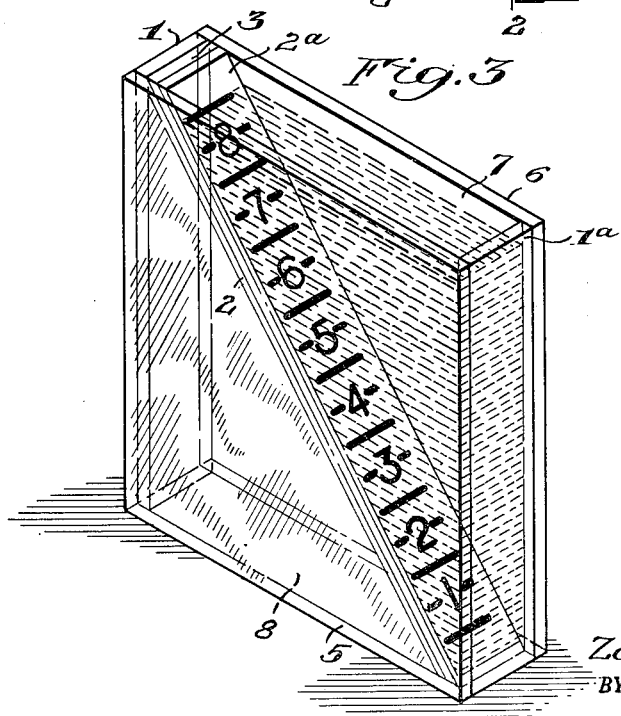
INVENTOR.
Zoltan Imre Kertesz
BY Charles Shepard
Attorney Patented Apr. 29, 1952

2,595,082

UNITED STATES PATENT OFFICE 2,595,082

SIMPLE TURBIDITY MEASURING DEVICE

Zoltan Imre Kertesz, Geneva, N. Y.

Application April 25, 1950, Serial No. 158,011

1 Claim. (Cl. 88—14)

This invention relates to improvements in measuring and numerically expressing the turbidity or clarity of various liquids by a device void of complicated, moving or removable parts and without requiring any particular skill on the part of the operator.

The turbidity or clarity of liquids is often an important consideration in determining the utility and value of various food products. For example, in the United States Standards for grades of canned peas and for canned green or wax beans, the turbidity of the liquid (liquor) drained from the canned product is assigned 10 out of the 100 possible points which will determine the grade and to a large extent the commercial value of these two commodities. The cloudiness of such liquids drained from canned peas or canned beans is now usually determined by judging their transparency in a glass cylinder without the aid of any particular device. The verbal definitions of clearness or cloudiness in these Standards and with such apparatus are difficult to detect and express.

In the cases of fruit juices, nectars, sirups, concentrates, etc. the clarity of the product is again an important characteristic. For example, the proposed United States Standards for grades of canned apple juice recognizes two styles of apple juice, namely, clear and cloudy. These are defined as "typical of clarified apple juice" and "typical of non-clarified apple juice," respectively, both similarly difficult to detect and express for the same reasons. The lack of exactness in the definition of the cloudiness or clarity of such products also makes it difficult for the manufacturer to describe exactly and to standardize his product. A similar uncertainty exists in the cases of many synthetic carbonated drinks where considerable effort is made to produce cloudy rather than clear liquids.

The turbidity of honey, vinegar and of many other food products is of equal importance but is now at times controlled to an undesirable extent only because of the lack of simple measuring devices giving numerical definition to the extent of clarity or turbidity desired.

In the chemical and manufacturing industries, liquids are often allowed to settle or are filtered in order to give products of increased transparency. In most cases the clarity of such products is either defined in an arbitrary manner or require measurements with complicated and expensive instruments or the services of an expert specifically trained to render judgement concerning this matter.

Nephelometers and various photoelectric devices have been often used for the measurement of the turbidity in liquids. However, such instruments are expensive and require skilled operators. In recognition of the difficulties encountered in the subjective evaluation of the turbidity or clarity of various liquids, a number of various instruments have been suggested in order to aid the observer. These devices have never attained wide-spread application because they were complicated, expensive to manufacture, difficult to operate and were in general of such nature that the use of a single instrument for a variety of purposes was impossible.

The principal object of the present invention is to provide a simple and inexpensive device by which the turbidity or clarity of a wide variety of liquids and solutions can be quickly measured and numerically expressed without requiring any particular skill or experience on the part of the operator.

These and other desirable objects may be attained in the manner disclosed as an illustrative embodiment of the invention in the following description and in the accompanying drawings forming a part hereof, in which:

Fig. 1 is a central vertical section, taken from front to rear, of a turbidity measuring device constructed in accordance with and illustrating one embodiment of my invention;

Fig. 2 is a relatively transverse vertical section therethrough taken on the line 2—2 of Fig. 1 in a plane coincident with the rear face of the front or observation wall of the device; and Fig. 3 is a perspective view.

The same reference numerals throughout the several views indicate the same parts.

My simple turbidity measuring device consists of a transparent wedge-shaped structure in which the maximum depth of a liquid through which a scale placed on the opposite side of the structure is still visible is determined. Such a wedge might be constructed singly but I have found it more suitable to use a simple structure which contains two such wedge-shaped containers. This latter device is obtained by the diagonal partition of a rectangular box-like structure open on the top and on the bottom. The device is constructed from any suitable clear and transparent material or materials.

Referring more particularly to the drawings, the model illustrated has two side walls 5 and 6 of about 9.5 x 12.8 cm. dimensions and of an appropriate thickness to give the completed structure sufficient strength and stability. These two plates are held together by two other, narrow front and rear plates 1 and 1a of about 2.5 x 12.8 cm. size. The rectangular structure thus formed is open on the top and on the bottom as indicated at 7 and 8 which open ends are squared off so that the edges of the walls may alternatively constitute bases when the device is inverted on a flat supporting surface. It is diagonally divided by a plate or several fused plates on which a scale is engraved. In this drawing the narrow front and rear plates 1 and 1a are shown in cross section. The diagonal plates, designated by 2 and 2a are also shown in cross section being superposed one upon the other. The scale, designated by 3, is placed between the plates.

For the determination of the turbidity or clarity of a liquid or solution, the top wedge of the instrument is filled with the material to be tested and then the observer's vision is directed horizontally from the direction of the narrow side of the instrument through the liquid and towards the dividing plate with the scale. Figure 2 illustrates what the observer would see in the case of a completely clear liquid while Figure 3 shows a view of the whole instrument, filled with the test liquid and in usage. The observer views the device from the direction of arrow designated by 4 in this figure and reads the last line on the scale which is still at all visible through the liquid column. The scale is designed in a manner to indicate the thickness of the liquid column within the instrument in 0.5 cm. steps at the different horizontal levels. Thus the reading will indicate the centimeters the maximum depth of the liquid through which the scale is visible to any extent. In practical work I have found it desirable to read the scale to the nearest 0.5 cm. unit as indicated by lines on the scale of the model of my device described here, but in experimental work I have found it possible and desirable to estimate the reading to the nearest 0.25 cm. unit.

It is to be understood, that the structure described above is only one of the many possible applications of the principle of determining the clarity or turbidity of a liquid by observing it in a wedge-shaped container which provides an increasingly broad layer of the liquid and determining the point of limiting transparency by a scale placed on the far end of the wedge containing the liquid. Indeed, the size and the shape of the device may be changed in order to increase or decrease the range of clarity or cloudiness for which the device will be applicable. It is also clear that other scales than that described above might be used but this again does not change the principle embodied in this invention. However, after trying to assess the range of turbidities most frequently encountered in various instances and especially with food materials, I have found that a device of the size and shape described above might be of the most general utility.

I have found that most consistent readings are obtained if the observer holds the device away from light rather than towards it, thus having the major source of light behind him. Within reasonable limits, the intensity of the light and the coloring of the liquid do not affect the readings although good light makes the reading of the scale easier.

When the reading is completed, the test liquid is poured out and the container is rinsed. Thereupon the device is turned upside down and the top wedge is now used for the next test while the other drains and dries.

The utility and limitations of this device will be obvious to all who have dealt with the evaluation of the turbidity or clarity of liquids but I will give a few instances as illustrations.

In evaluating the cloudiness of the liquid drained from canned peas or canned beans, I have found that replicate readings made by the same observer will not usually vary in excess of 0.25 unit of the scale described above. In a set of samples representing the liquid drained from 216 samples of canned peas, an experienced grader using the now customary subjective method of judging the cloudiness in glass cylinders, assigned a wide variety of scores to many samples which gave practically identical scores by my device. To quote a specific example, of the samples which were rated by my device as being in the range of 2.00–2.25, 17 samples were given a score of 9; 39 a score of 8; 37 a score of 7; and 2 a score of 6, out of a total possible score of 10 points.

With apple juice I found that the brilliantly clear juice samples gave readings above 8.0 on the model of my device described above, while the readings on cloudy juices ranged 0.5–1.5. The many types of products with intermediate cloudiness fell mostly in the range of 2.0–6.0. Thus little difficulty is experienced with my device in giving much more exact definitions to the states of clarity or turbidity of the various types of clear and cloudy apple juice now produced.

I have also tested the utility of my device in the case of a filtration process. The pectin extracts obtained during the course of pectin manufacture from citrus peel or apple pomace are cloudy and must be filtered clear in order to give a completely satisfactory product. Such extracts were found to have turbidities to give readings around or below 1.0 on the above model of my device. On account of the colloidal nature of such solutions, the maximum clarity which may be attainable with these extracts is in the range of 7.0–8.0 on the above model of my simple turbidity measuring device. Thus this instrument provides a full range of the clarity measurements which can be used by the operator to evaluate the success of the filtration process.

A further type of usage for my device is in substituting it either for the more complicated electrometric methods or for the much less exact unaided visual comparisons used in chemical analyses by turbidometric methods. Many additional examples of the utility of my simple turbidity measuring device could be cited but it is felt that the scope of its applicability has been sufficiently illustrated.

What I claim is:

A turbidity measuring device embodying a duplex invertible liquid container comprising a rectangular box-like body having parallel transparent front and rear walls, parallel side walls, and being open at top and bottom, and a graduated scale plate extending diagonally from the bottom of the front wall to the top of the rear wall in liquid-tight sealing engagement with said front and rear walls and with both side walls and dividing the interior of the body into two identical wedge shaped liquid containable compartments, said scale plate being viewable through either of the front and rear walls, the open top serving as a filling opening for one compartment when the other compartment is empty and the open bottom is serving as a supporting base, and the latter serving as a filling opening for the other compartment when the device is inverted and the open top first mentioned becomes a base.

ZOLTAN IMRE KERTESZ.

REFERENCES CITED

The following references are of record in the file of this patent:

UNITED STATES PATENTS

| Number | Name | Date |
|---|---|---|
| 171,838 | Munnich | June 4, 1876 |
| 1,616,092 | Stirlen | Feb. 1, 1927 |
| 2,487,238 | Hallerberg | Nov. 8, 1949 |

FOREIGN PATENTS

| Number | Country | Date |
|---|---|---|
| 285,848 | Great Britain | June 28, 1928 |